July 26, 1932.  G. G. CREWSON  1,869,093
EVAPORATOR
Filed May 31, 1929   4 Sheets-Sheet 4
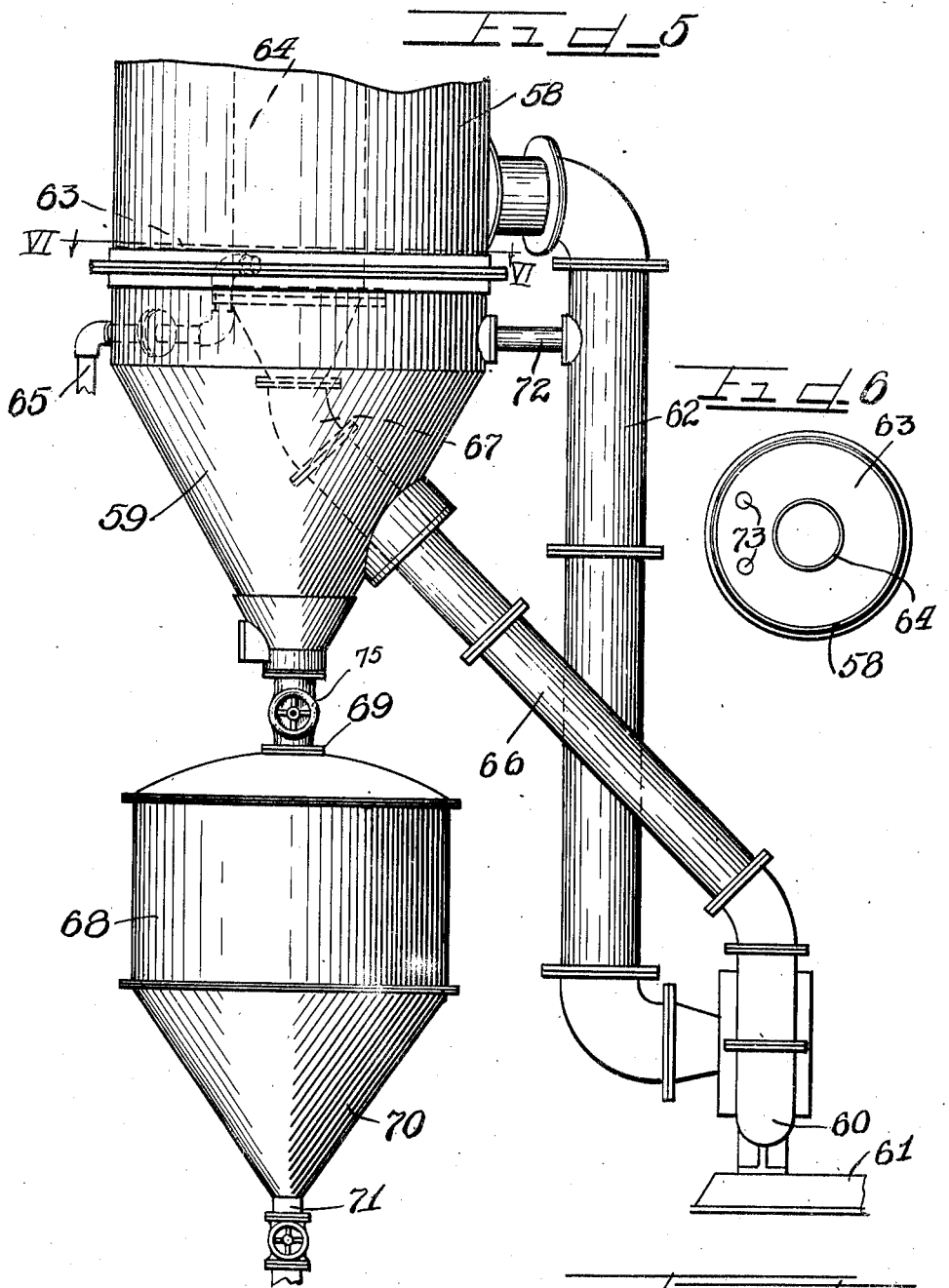
Inventor
George G. Crewson Patented July 26, 1932

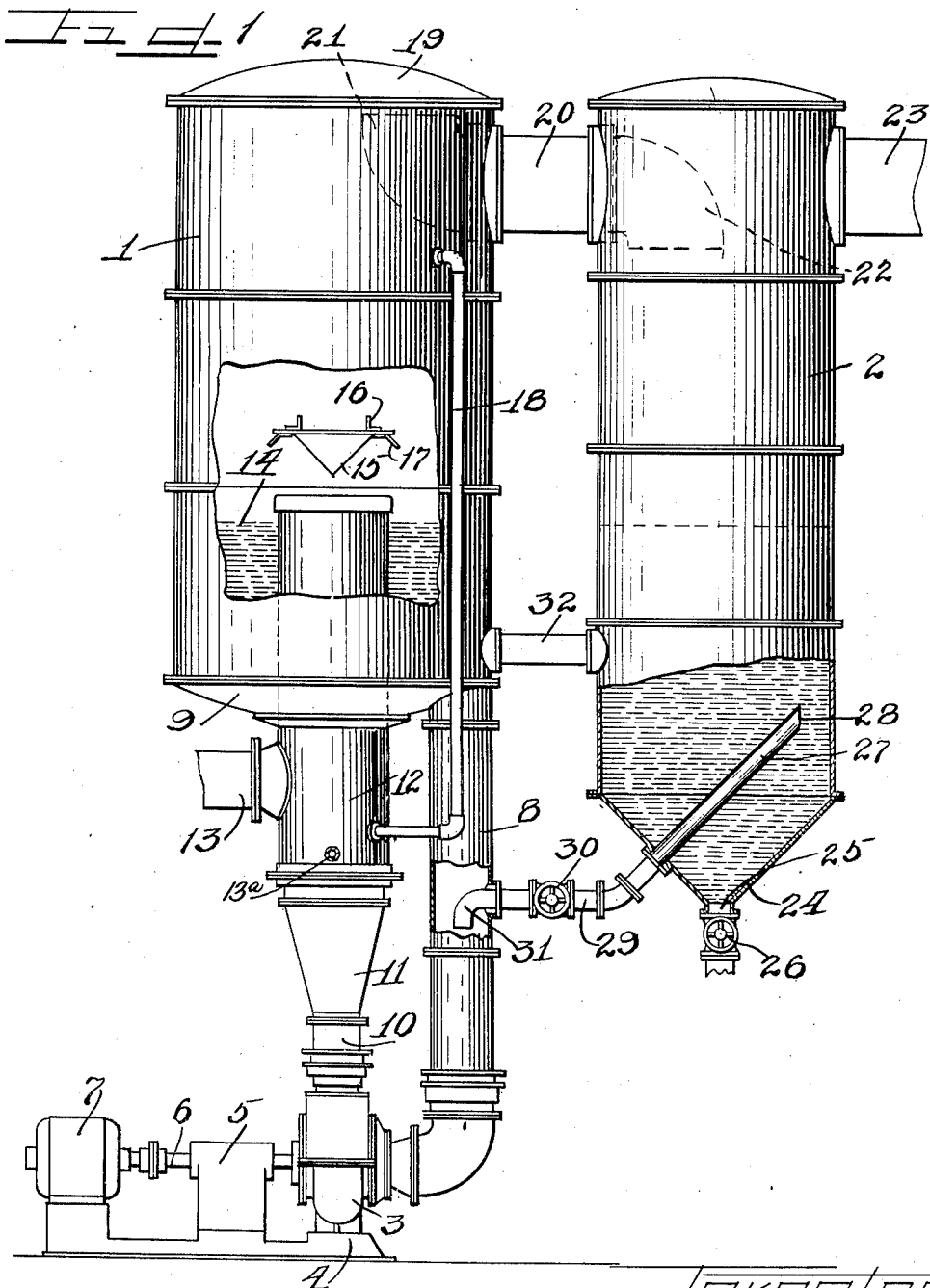

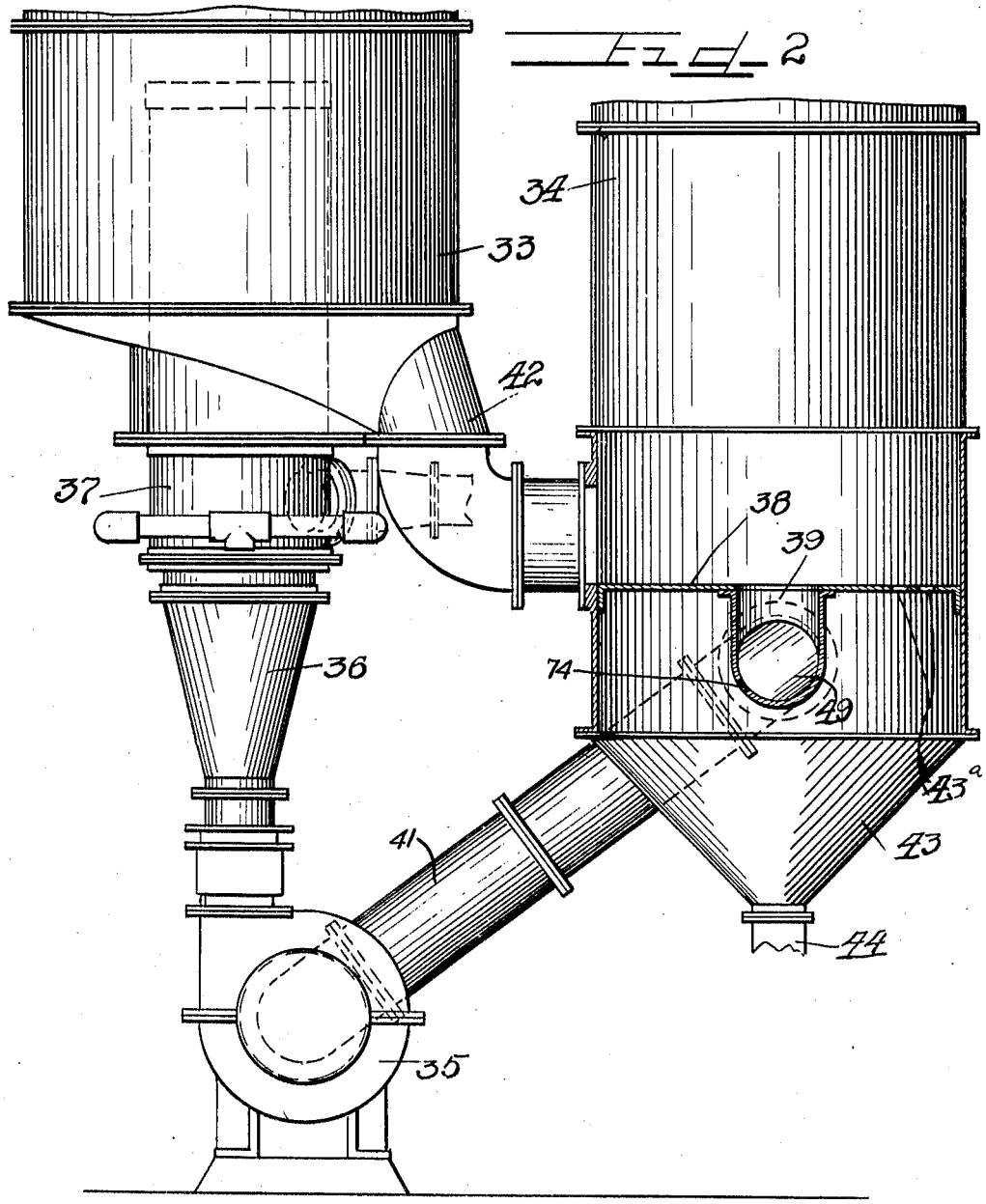

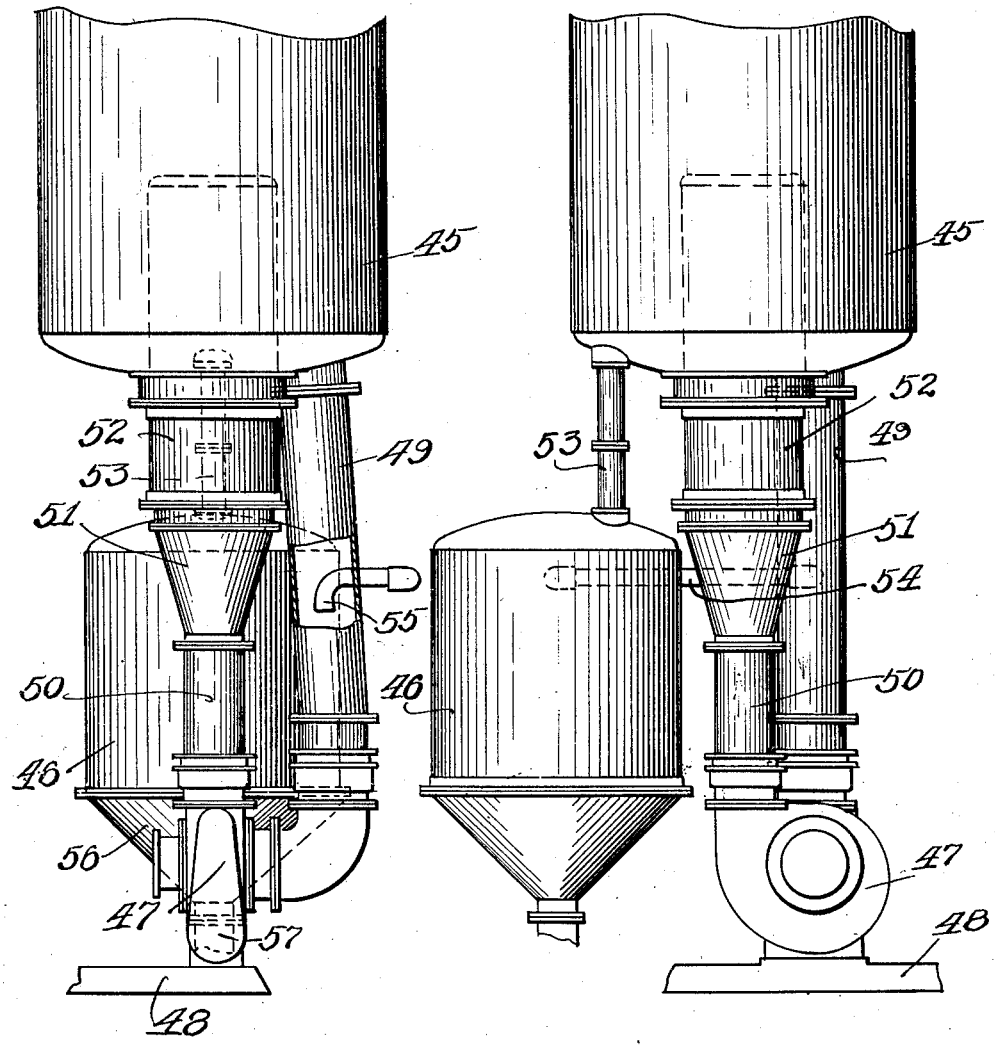

1,869,093

UNITED STATES PATENT OFFICE

GEORGE G. CREWSON, OF BUFFALO, NEW YORK, ASSIGNOR TO SWENSON EVAPORATOR CO., OF HARVEY, ILLINOIS, A CORPORATION OF ILLINOIS

EVAPORATOR

Application filed May 31, 1929. Serial No. 367,225.

This invention relates to an evaporator and particularly to a forced circulation evaporator wherein there is provided a quiet zone to permit the separation of solids, which may be withdrawn as desired without interfering with the operation of the evaporator.

An object of the invention is to provide a forced circulation evaporator wherein evaporation may be continuous and the removal of the settled matter intermittent.

Another object of the invention is to provide a forced circulation evaporator wherein a quiet zone is created for the settling out of the solids and from which such solids may be removed as desired.

A further object of the invention is to provide a forced circulation evaporator wherein by arrangement of the parts single, double, triple and/or other evaporating effect may be created.

A still further object of the invention is to provide a forced circulation evaporator which will be efficient in use and economical in operation.

The above, other and further objects of the invention will be apparent from the following description, accompanying drawings and appended claims.

According to the invention it contemplates an evaporator into which solution is delivered and from which the solution is withdrawn by suction and returned under pressure, the solution being heated on its return to the evaporator. A settling device is provided in the system in which there is a quiet zone where the solids are free to settle out of the solution and from which the solids may be withdrawn at intervals.

Embodiments of the invention are illustrated in the accompanying drawings and the views thereof are as follows:

Figure 1 is a side elevational view with parts broken away and other parts in section showing the preferred form of apparatus embodying the invention.

Figure 2 is a side elevational view of another arrangement of evaporator and settling device with only the lower end of the evaporator and settler shown.

Figure 3 is a side elevational view of another form of the invention.

Figure 4 is a view of the apparatus shown in Figure 3 taken at ninety degrees to the arrangement of Figure 3.

Figure 5 is a side elevational view of another form.

Figure 6 is a plan view of a diaphragm used in certain of the evaporators.

Referring to Figure 1, an evaporator 1 is supported in any convenient manner on a floor. A settler 2, shown in this figure as a separate tank, is arranged along side of the evaporator 1 and supported in any convenient manner.

A centrifugal pump 3 is mounted on a base 4 on the floor and on the same base 4 is a bearing 5 through which passes a shaft 6 for driving the pump 3. Said shaft 6 is connected to a motor 7 which is controlled in any well known manner for operation of the centrifugal pump 3.

A pipe 8 leads from the lower end casting 9 of the evaporator 1 and communicates with the interior of the evaporator at the bottom thereof, leading at its lower end into the suction or inlet side of the pump 3. The discharge or pressure side of the pump is connected by means of a pipe 10 to an enlarged throat 11, which in turn communicates with the heating element, comprising a drum 12, a portion of which extends within the body 1. A plurality of pipes are arranged within the drum 12 through which the solution is forced under pressure by the centrifugal pump 3. The drum 12 is provided with a steam inlet 13, whereby steam may be admitted to the drum surrounding the pipes therein for heating the solution passing through the pipes, and an outlet 13a.

The normal level of the solution within the evaporator body 1 and the settler 2 is indicated by the line 14.

A V-shaped baffle plate 15 is secured within the evaporator 1 by means of angle plates 16 fastened to said evaporator shell. The baffle plate 15 is placed centrally over the drum 12 to spread outwardly the vapors and entrained liquor issuing from the heating element. The baffle plate has a downwardly directed margin 17 for the purpose of directing entrained liquor downwardly to prevent it from being carried along with the vapor.

An air relief pipe 18 opens into the evaporator 1 near the top thereof at one end of said pipe and at its lower end opens into the drum 12.

The upper end of the evaporator 1 is closed by a head 19.

The evaporator 1 and the settler 2 are connected by a vapor pipe 20 arranged near the upper ends thereof, the inlet end 21 of said pipe opening upwardly adjacent the head 19 of the evaporator and the discharge end thereof opening downwardly as shown at 22 in the settler 2. Another vapor conduit 23 communicates with the interior of the settler 2 and may be connected for accumulation or disposal of the vapors, or may lead to another evaporator effect, in any well known manner.

The lower end of the settler 2 is provided with a cone bottom 24 terminating in a valve controlled outlet 25. A valve 26 is positioned in said outlet for governing the discharge through said outlet.

An inclined pipe 27 extends into the lower part of the settler 2 and has its open end 28 above the bottom 24 thereof and adjacent the wall thereof. The pipe 27 is connected by a pipe 29 having a control valve 30 therein with the suction pipe 8 of the main circulating system. The portion 31 of the pipe which enters the pipe 8 is downturned for directing the liquid withdrawn through pipe 27 into the downwardly moving stream of solution in the suction pipe 8.

The evaporator 1 and settler 2 are connected near the bottoms thereof by a pipe 32 which allows a constant, slow circulation of liquor into the settler 2 and accumulation of solution in the settler 2 rising to the same height as in the evaporator 1.

The operation of the evaporator disclosed in Figure 1 of the drawings is as follows:

Solution, such as a salt or sugar solution, soap, lye or the like is delivered to the evaporator 1 by any suitable means, whereupon the motor 7 is actuated and the centrifugal pump 3 put in action. The pump withdraws by suction the solution from the evaporator downwardly through the conduit 8, and forces it back upwardly through the steam heated drum 12, whereupon a part of the solution is vaporized and the vapor and solution discharged upwardly against the baffle 15. There the vapor and solution are spread and the solution that may be carried along bodily with the vapor is thrown back into the body of solution in the lower part of the evaporator body with the vapors escaping through the pipe 20 into the settler 2. Suction through the conduit 8 draws to some extent solution from the settler 2, so that a secondary, slow circulation is set up through said settler. The zone within the settler 2 is termed herein a "quiet zone", because, being separate from the main circulating system, no agitation of the liquid takes place therein. This quiet zone allows the accumulation of the crystals or solids in the bottom portion 24 of the settler, whence said solids may be withdrawn at intervals by means of the valve 26 or, when the system is under vacuum, by any suitable means.

The form of the invention illustrated in Figure 2, includes an evaporator effect 33, a settler 34, a centrifugal pump 35 and a discharge throat 36 diverging upwardly and communicating with the heating element, or drum 37, a portion of which drum extends within the evaporator 33.

A baffle plate 38 is secured within the settler 34 near the lower end thereof. Said plate is provided with a centrally disposed opening 39 into which is fitted a laterally extending pipe 49, which in turn communicates with a pipe 41 connected to the suction side of the pump 35. A conduit 42 leads from the lower end of the evaporator 33 and discharges into the settler 34 immediately above the plate 38, so that the pump 35 draws solution from the evaporator 33 through the pipe 42 into the upper portion of the settler 34, pipes 40 and 41 to the pump 35, whence the solution is returned under pressure through the drum 37. The drum 37 is provided with suitable heating tubes as described with reference to Figure 1, whereby the solution passing the same may be heated and a part of the solution vaporized so that the discharge from the upper end of the drum 37 will be a vapor discharge with a small amount of liquid suspended therein.

The plate 38 is provided with a few apertures 43a arranged away from the suction area, which is that immediately adjacent the opening 39. These apertures allow the passage of liquid and suspended solids into the lower portion of the settler 34. The pipe 40 within the settler 34 is provided with one or more apertures 74 to allow slow circulation back into the suction side of the pump 35. The settler 34 is provided with a conical bottom 43 similar to the bottom 24 of the settler 2 of Figure 1, whence the separated crystals or the like may be withdrawn as described with reference to Figure 1.

The operation of the apparatus of Figure 2 is as follows:

The centrifugal pump 35 is actuated by a motor to create circulation of the solution from the evaporator downwardly through the lower part of the settler 34, thence to the centrifugal pump, by which it is delivered under pressure upwardly through the heated drum 37, wherein the solution is partially vaporized.

A zone of quiet is created in the settler 34 below the diaphragm 38 to allow accumulation and settling out of the salt or other solids being separated. A small, constant flow of solution occurs through the apertures 43a in the diaphragm 38, through the lower portion of the settler 34 and out through the aperture 74 into the pipe 40.

The form of the invention illustrated in Figures 3 and 4 includes an evaporator 45 and a settler 46 arranged below the lower end of the evaporator 45.

A suction pump 47 is mounted on a base 48 and operated by any suitable source of power, such as the electric motor 7 illustrated in Figure 1. A pipe 49 leads from the bottom of the evaporator 45 downwardly into the suction side of the pump 47, while from the pressure side of the pump a pipe 50 leads upwardly communicating with a diverging throat 51, which in turn communicates with a heated drum 52, a portion of which drum is within the evaporator body 45. The drum 52 is heated in the same manner as described with reference to Figure 1.

The settler 46 is connected by means of a pipe 53 to the lower end of the evaporator 45 so that there is solution at all times within the settler 46. A pipe 54 enters the settler 46 near the upper end thereof and communicates with the suction pipe 49 of the main circulating system through a downturned end 55 terminating within the pipe 49.

The lower end of the settler is provided with a cone bottom 56 having a valve controlled outlet 57 for withdrawal of crystals or the like.

The operation of the form of the invention illustrated in Figures 3 and 4 is as follows:

The centrifugal pump 47 is put in operation after the evaporator has been supplied with solution to a height below the upper end of the drum 52, whereupon the solution is circulated downwardly through the suction pipe 49 into the pump and upwardly through the heated drum 52, wherein the solution is partially vaporized and discharged upwardly against a baffle, if desired, similar to the baffle 15 illustrated in Figure 1. The suction created in the pipe 49 draws into said pipe a portion of the solution from the settler 46, a quiet zone being created within the settler 46 to allow settling of the solids in the lower end 56, from which the solids may be withdrawn as desired by means of the valve controlled outlet 57.

The form of the invention illustrated in Figure 5 includes an evaporator 58 having a conic bottom 59. A centrifugal pump 60 is mounted on a suitable base 61 and is driven by means (not shown) in any desired manner, such as for instance as by an electric motor 7 similar to that illustrated in Figure 1. A suction pipe 62 communicates with the interior of the evaporator 58 a slight distance above the conical bottom casting.

An apertured diaphragm 63 is supported in the lower end of the evaporator 58 just below the entrance of the discharge pipe 62 so that the suction effect created takes place immediately above the diaphragm.

A drum 64 is arranged within the evaporator 58 with its lower end extending through and terminating immediately below the diaphragm 63. The drum is supplied with steam for heating purposes through a pipe (not shown) the condensate being discharged through a pipe 65.

A discharge pipe 66 leads from the pressure side of the pump 60 and communicates by means of an elbow 67 with the lower end of the drum 64 so that the solution delivered to the drum 64 through the pipe 66 may be partly vaporized by the heat within the drum 64.

The settling device shown in Figure 5 includes the lower portion 59 of an evaporator and a receiver 68 connected thereto and arranged in axial alignment therewith. A pipe 69 and valve 75 provide communication between the lower end of the conical bottom 59 of the evaporator 58 and the receiver 68. The receiver 68 is provided with a conic bottom 70 having a valve controlled outlet 71.

A pipe 72 communicates with the pipe 62 on the suction side of the pump 60 and also with the interior of the evaporator immediately below the diaphragm 63, thereby creating a quiet zone below said diaphragm to allow settling of the solids, such as salt, sugar or the like, in the lower portion 59 of the evaporator. Such solids pass through the valve controlled outlet 69 into the receiver 68 and may be withdrawn therefrom by closing the valve 75 and opening the valve in the outlet 71.

The operation of the form of the invention illustrated in Figure 5 is as follows:

The centrifugal pump 60 is placed in operation by any suitable source of power, whereupon the solution within the evaporator 58 is circulated downwardly through the suction conduit 62, through the pump 60 and upwardly through the discharge conduit 66 into the heating element 64. The liquid is there partially vaporized.

Diaphragm 63 is provided with two or three apertures 73 arranged in a remote section thereof with respect to the pipe 72 to allow a relatively slow circulation into the lower end of the evaporator and through the pipe 72 into the suction side of the pump. The solids separate out in the quiet zone thus formed and fall into the receiver 68.

The forms of the invention here illustrated may be arranged for single or multiple effect evaporators.

It will be observed that the evaporators illustrated and described herein all include means for effecting or inducing a relatively slow, secondary circulation of the liquid with the creation therein of a quiet zone. Provision is made for withdrawing liquid from the quiet zone into the suction side of the main circulating system. Settlings may accumulate and the solids settle more readily in this quiet zone by reason of the absence of disturbing currents. The solids may be withdrawn from this quiet zone at intervals as desired.

The invention has been described herein more or less precisely yet it is to be understood that changes may be made in the arrangement and proportion of parts, and that equivalents may be substituted without departing from the spirit and scope of the invention.

The invention is claimed as follows:

1. A forced circulation evaporator, comprising an evaporating vessel, a main circulating system including means for drawing liquid therefrom and delivering said liquid thereto under pressure, a secondary circulating system connected to said vessel and to said main circulating system and a settler in said secondary circulating system for permitting a settling out of solids from said liquid under relatively quiescent conditions.

2. In combination, an evaporator and a settler, said evaporator comprising an evaporating vessel, a U-shaped conduit connected to said vessel, one arm of said U-shaped conduit having a heater therein and extending into said evaporating vessel, the second arm being connected to the bottom of said vessel, said settler comprising a closed casing having cone shaped bottom, and conduits spaced from said bottom and communicating with said evaporating vessel and said second arm respectively.

3. A precipitating apparatus comprising a vertical primary container adapted to hold a body of liquid, means for forcedly circulating a primary stream of the liquid in said container and discharging it freely vertically above the body of liquid therein, said means comprising a pump, a suction conduit, and a discharge conduit having a portion thereof extending vertically in the container, a secondary liquid container arranged providing a space for the settling of solids, means defining a restricted inlet connection between the secondary container and the main body of liquid, and conduit means connecting said secondary container to the suction conduit to cause flow of a secondary stream of fluid through said secondary container during the normal operation of the apparatus, said secondary container having a portion thereof defining a quiescent zone for liquid.

4. A precipitating apparatus comprising a vertical primary container adapted to hold a main body of liquid, means for forcedly circulating a primary stream of the liquid in said container, said means comprising a pump, a suction conduit and a discharge conduit having a portion thereof extending vertically in said container to discharge liquid freely above the main body therein, a secondary liquid container arranged providing a space for the settling of solids and a quiescent zone for the liquid, means arranged to produce circulation of a secondary stream of the liquid during normal operation of the apparatus, said means comprising apertured baffle means in the path of the main stream forming restricted inlet means connecting said secondary container with the main body of liquid, and means forming a restricted outlet for said secondary container connected to the suction conduit.

5. A precipitating apparatus comprising a primary container adapted to hold a main body of liquid, a secondary container arranged providing a space for the settling of solids and a quiescent zone for liquid, means for forcedly circulating the main body of liquid, said means comprising a pump, a suction conduit, and a discharge conduit, means for causing circulation of a secondary stream of liquid through said secondary container during normal operation of the apparatus, said means comprising means forming a restricted liquid inlet connection between said primary container and said secondary container, and means defining a restricted outlet connecting said secondary container with the suction conduit.

6. The method of precipitating solids from a body of liquid which consists in the steps of forcedly circulating a main body of the liquid in a main stream, freely discharging the liquid at a point in the main circulating system, diverting a small portion of the main stream into a secondary body of liquid at a point in said secondary body under hydrostatic pressure, and connecting said secondary body of liquid with the main stream to cause movement of liquid therethrough and thereby produce a secondary stream of liquid in parallel flow relation with a portion of the main stream.

7. The method of precipitating solids from a body of liquid which consists in the steps of forcedly circulating a main body of the liquid in a main stream, applying heat to the main stream of liquid, freely discharging the liquid at a point in the circulating system, diverting a small portion of the main stream to produce a secondary stream in parallel flow relation to a portion of the main stream, and discharging liquid from said main stream into said secondary stream at a point in the secondary circulating system and within a secondary body of relatively quiescent liquid to permit the settling of solids within said quiescent liquid.

8. A precipitating apparatus comprising means for forcedly circulating a main body of liquid and for discharging it freely at a point in the circulating system, said means comprising a main container adapted to hold a body of liquid, a pump, a suction conduit, a discharge conduit having its discharge outlet positioned above the body of liquid in the container, means to divert a small portion of the main stream into contact with a relatively quiescent secondary body of liquid to permit the settling of solids in the quiescent liquid, said means comprising a secondary container providing a space for the settling of solids and a quiescent zone for liquid, means defining a restricted inlet for said secondary container in fluid flow connection with the main container, and means defining a restricted outlet for said secondary container connected to discharge into the suction conduit.

9. In an apparatus for the precipitation of solids from liquids, in combination, a main vertical container containing a main body of liquid, means to forcedly circulate the liquid in a main stream comprising a pump, and suction and discharge conduits therefor connected to said container, the discharge conduit being positioned to discharge liquid freely above the liquid in the container, a secondary vertical container containing a relatively quiescent body of liquid, means to produce a secondary stream flow of liquid in parallel flow relation with a portion of the main stream, said means comprising conduit means connecting the main body of liquid and the secondary body of liquid at a point between the top and bottom of the liquid bodies in each container, and another conduit connecting said secondary container discharging into the suction conduit, the inlet for said other conduit being connected at a point where the fluid pressure is but slightly different from that at the point of discharge of the conduit connecting the secondary body with the main body of liquid.

10. In an apparatus for the precipitation of solids from liquids, in combination, a main container containing a main body of liquid, means to forcedly circulate the liquid in a main stream comprising a pump and suction and discharge conduits therefor connected to said container, the discharge conduit being positioned to discharge liquid freely above the liquid in the container, a secondary container containing a relatively quiescent body of liquid, means to produce a secondary flow of liquid in parallel relation with a portion of the main stream, said means comprising conduit means connecting the main and secondary bodies of liquid, the inlet and outlet ends of said conduit means being normally submerged, and another conduit connecting said secondary container discharging into the suction conduit, the inlet for said other conduit being connected at a point near the discharge level of the conduit connecting the secondary body with the main body of liquid.

In testimony whereof I have hereunto subscribed my name at Buffalo, N. Y., county of Erie.

GEORGE G. CREWSON.